(12) United States Patent
Minton et al.

(10) Patent No.: US 6,648,189 B1
(45) Date of Patent: Nov. 18, 2003

(54) ELASTOMERIC HAT BLOCKING FORM (76) Inventors: Thomas Minton, 2683 Corydon, Norco, CA (US) 92860; Terry Garrett, 9847 Terradel St., Pico Rivera, CA (US) 90660; Jimmy R. Solway, 965 Second St., Norco, CA (US) 92860-3058

( * ) Notice: Subject to any disclaimer, the term of this patent is extended or adjusted under 35 U.S.C. 154(b) by 0 days.

(21) Appl. No.: 10/074,123

(22) Filed: Feb. 12, 2002

Related U.S. Application Data
(60) Provisional application No. 60/268,693, filed on Feb. 15, 2001.

(51) Int. Cl.[7] ................................. A42C 1/00
(52) U.S. Cl. ........................... 223/24; 223/84
(58) Field of Search ..................... 223/24, 84

(56) References Cited

U.S. PATENT DOCUMENTS

| | | | |
|---|---|---|---|
| 4,113,154 A | 9/1978 | Emmons | 223/24 |
| 4,491,256 A | 1/1985 | Payne et al. | 223/24 |
| 5,148,954 A | 9/1992 | Myers | 223/24 |
| 5,481,760 A | 1/1996 | Wood, Jr. | 2/195.5 |
| 5,725,134 A * | 3/1998 | Weltge | 223/24 |

* cited by examiner

Primary Examiner—John J. Calvert
Assistant Examiner—James G Smith
(74) Attorney, Agent, or Firm—Charles H. Thomas (57) ABSTRACT A system for cleaning and blocking hats involves the use of a water impervious, elastomeric, foam form that permits a hat to be washed with a conventional laundry washing detergent without shrinking or losing its shape. The spongy, foam form is resiliently compressed somewhat so that, following laundering, the hat can be mounted upon the form in tight-fitting engagement therewith. The hat, mounted upon the form, is then left to dry in open air. The hat, once dried following laundering, may be removed from the form and sprayed with an appropriate aerosol spray that stiffens and retards deformation of the hat. The hat, while still moist from the spray, is placed back on the form and is then left to again dry in ambient air. Once dry, the hat is removed from the form. Following this treatment the hat is clean, but is not deformed by shrinking or otherwise. To the contrary, it retains its original shape and blocking.

18 Claims, 6 Drawing Sheets

ELASTOMERIC HAT BLOCKING FORM

This application claims the benefit of the filing date of U.S. Provisional Application No. 60/268,693 filed Feb. 15, 2001.

BACKGROUND OF THE INVENTION

1. Field of the Invention

The present invention relates to a system for laundering and blocking hats and an elastomeric hat blocking form employed for that purpose.

2. Description of the Prior Art

Hats that are formed of natural cloth, or in some cases synthetic fabrics, are very frequently constructed with cap portions that conform generally to the shape of the human head with a relatively stiff bill projecting from the forehead area of the cap to serve as a sunshield for the eyes of the wearer. Hats of this type are widely used in every walk of society. For example, hats constructed in this fashion are utilized for specific purposes such as golf hats, baseball caps, and also for general purpose headwear. While some hats of this type are cheaply constructed and are sold as throwaway items, more often a hat of this type represents a more substantial investment. Consequently, when the hat becomes dirty, the owner may well wish to clean it.

At present, satisfactory systems for cleaning hats at a relatively low cost have been unavailable. If the owner of the hat attempts to wash it with a conventional laundry detergent, the hat will very often shrink and become severely distorted when it dries. It is not unusual for a hat to shrink to the point where it will no longer fit the owner when laundered in this fashion. For this reason, many hat manufacturers include printed instructions on the hats warning the owner to attempt to clean the hat only by dry cleaning. However, this is rather expensive and the cost of the hat often does not justify the expense of dry cleaning it. Furthermore, dry cleaning chemicals can also permanently distort the shape of a hat and discolor it as well.

There are systems that have been devised for blocking hats so as to allow a hat to be cleaned without becoming permanently distorted. Several of these systems are described in the following issued U.S. Pat. Nos. 4,113,154; 4,491,256; 5,148,954; and 5,481,760. However, none of these systems allow a hat to be laundered using a conventional laundry detergent and then dried without some distortion of the hat.

SUMMARY OF THE INVENTION

The present invention provides a system for cleaning and blocking hats that allows a hat to be restored to an unsoiled condition while maintaining a near original condition of shape and stiffness at a minimal cost. The system of the invention allows hats to be cleaned by washing with a conventional laundry detergent without shrinking or any other distortion. The system of the invention may be used on wool or cotton caps and upon caps which are fitted or of adjustable sizes.

The system of the invention employs an elastomeric, foam hat blocking form which is a three-dimensional structure having an expansive, continuous outer surface that is rounded generally in the shape of the human head. This structure serves as a form upon which the hat is mounted after being washed with a laundry detergent. The elastomeric hat blocking form is made of a resilient, spongy, water impervious material that can be compressed somewhat to allow the hat to be mounted upon the form, and which will resiliently expand to the original shape of the hat.

The soiled hat is first hand washed with conventional laundry detergent and is thereafter mounted upon the form to dry. Because the form is resilient and compressible, and because it is partially compressed when inserted into the hat, it exerts outwardly directed forces throughout its outer surface that act against the inner surfaces of the hat into which it has been placed. As a result of these forces, the hat does not shrink and does not otherwise lose its shape.

Following laundering, the hat, while still damp, is placed upon the elastomeric hat blocking form of the invention where it is dried. Preferably, the hat is simply left to dry in the open, ambient air. If desired, after drying the hat may be sprayed with a hat spray formulation that aids in maintaining the original shape of the hat. One suitable hat spray product is QC formula #524-am-00. This hat spray is comprised of SD alcohol 40B, butyl ester of PVM/MA copolymer, isopropyl alcohol, and amino methyl propanol. After the hat has dried upon the form it is sprayed with this composition until slightly damp from it, and then is placed back on the elastomeric hat blocking form and left to dry again. When it air dries in about a half hour it is completely blocked and looks like new.

In one broad aspect the present invention may be considered to be a hat drying and blocking form comprised of a compressible and elastically resilient structure having a base delineating longitudinal and transverse axes of alignment and a crown having a continuous outer surface rising from the base and arcuately curved in both longitudinal and transverse directions for receiving a hat thereon while in a partially compressed condition. Preferably the drying and blocking form is further comprised of a flexible, polyurethane foam having a finished product density of between about 1.0 pounds per cubic foot and about 4.5 pounds per cubic foot. The polyurethane foam is preferably formed of a two-component system including a first polymeric isocyanate component and a second polyethylene polyol component. The first and second components are preferably mixed in a weight ratio of between about 33:67 to about 25:75. In the preferred formulation, the finished product foam density is about 2.5 pounds per square inch and the first and second components are mixed in a weight ratio of about 28:72.

There may be several variations in the geometric configuration of the form, depending upon the style all the. hat to be dried. For example, many popular hats are formed with a forwardly projecting hat bill and the forehead region of the crown extends upwardly in a near vertical orientation from the base of the bill where the bill projects out from the hat band. The preferred form of the invention for drying and blocking such hats has a base with an upwardly projecting crown having a forward, longitudinal end for receiving the forehead region of the hat and an aft longitudinal end for receiving the rear region of the hat. The forward, longitudinal end of the crown of the form rises abruptly from the base of the form and is curved sharply rearwardly at its upper extremity toward the center of the crown. The aft end of the crown of the form is more rounded than the forward end of the crown of the form.

A high profile drying and blocking form of this type may be constructed in different sizes. In one size of a high profile form suitable for drying and blocking hats having a hat size of between 6⅝ and 7¼, the form has a maximum circumference at a distance of about one inch above the bottom of the base of about 23¾ inches. The maximum height of this form occurs at the center of the crown about six inches above the base. Larger size hats from 7⅜ to 8 will require a form having a maximum circumference about three inches longer, that is about 26¾ inches. The maximum height of the form for these larger, high profile hats does not change.

Other popular styles of hats have a somewhat different configuration and may be more properly classified as rounded or standard, as opposed to high profile. The standard types of baseball caps, while having a slightly steeper aspect at the forehead region than at the rear region, are considerably more rounded in the forehead area than the high profile hats. The maximum circumference and the height of such forms suitable for hats with a hat size of between about 6⅝ and 7¼ is about the same as for the high profile form. That is, the maximum circumference of a standard form for such small and medium-sized hats is also about 23¾ inches and the maximum height at the center of the crown is also about six inches. The difference between the two forms is that the front end of the standard form is more rounded than the front end of the high profile form. Similarly, for larger size hats of 7⅜ to 8, the maximum circumference of the standard profile form for larger size hats, like its high profile counterpart, is also about 26¾ inches and the maximum height is also about six inches.

Considerable variations in dimensions are possible and even appropriate for different styles of hats. Typically the maximum height of the crown of the form extending up from the base is between about five and about seven inches.

In another broad aspect the invention may be considered to be the combination of a hat and a hat drying and blocking form. The hat has a hat band for encircling and contacting the head of a wearer and a hat crown having forehead and rear regions extending upwardly from the hat band to rest atop the crown of the head of a wearer. The hat drying and blocking form is comprised of a compressible and elastically resilient structure having a base and an arcuately curved crown projecting upwardly from the base and having an exposed, continuous, arcuate convex surface. The hat drying and blocking form is inserted into the hat and resides within the hat in a partially compressed condition with the hat band encircling the form and with the crown of the hat located in contact with the exposed convex surface of the crown of the form. The partially compressed form thereby exerts outwardly directed forces against the hat. The crown of the hat has an inner surface area that resides in contact with at least a large part of the crown of the hat drying and blocking form. Preferably the crown of the hat rho is in contact throughout with the crown of the hat drying and blocking form.

In still. another broad aspect the invention may be considered to be a method of blocking and drying hats which have a hat band for encircling and contacting the head of a wearer and a hat crown for extending over the crown of the head of a wearer comprising several steps. The steps include washing the hat with a laundry detergent; inserting into the hat while it is still damp a compressible and elastically resilient hat drying and blocking form having a form base and an arcuately curved, continuous form crown projecting upwardly from the form base by partially compressing the form so that the hatband encircles the form and the crown of the hat resides in contact with the crown of the hat form while partially compressing the hat form; releasing the hat form within the hat so that it remains in a partially compressed state and thereby exerts outwardly directed forces on the hat form while the hat remains mounted on the hat form; allowing the hat to dry; and removing the hat from the form once the hat has dried fully. Preferably the hat is allowed to dry in ambient air. If desired, the hat may be sprayed with a liquid hat blocking composition after it has been allowed to dry.

The invention may be described with greater clarity and particularity by reference to the accompanying drawings.

DESCRIPTION OF THE EMBODIMENT

Figure 1:
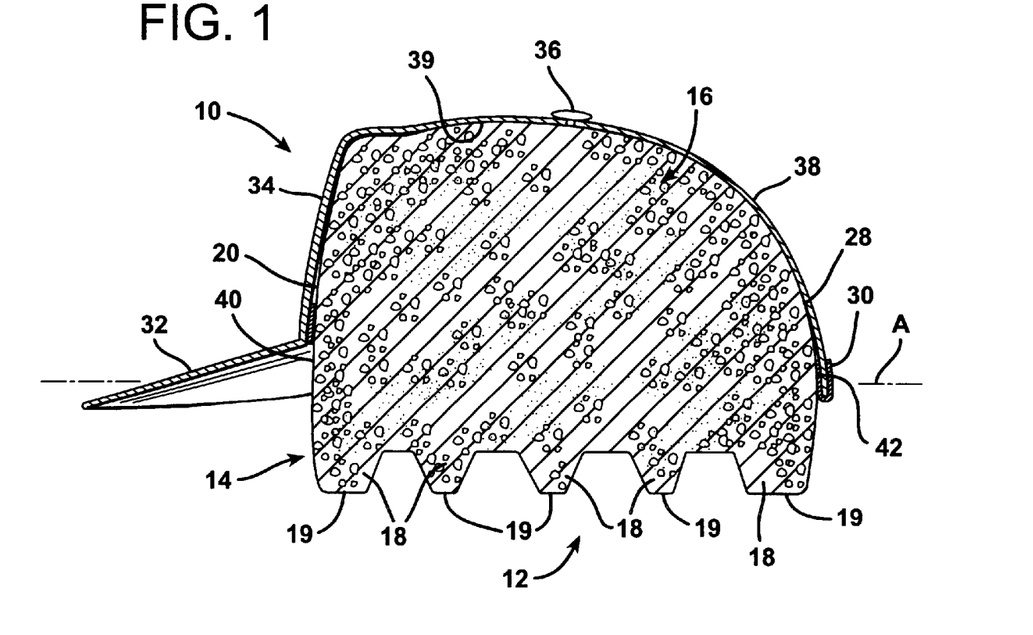
FIG. 1 is a side sectional view of a high profile hat blocking form utilized according to the invention shown with a hat mounted thereon.

FIG. 1 illustrates a hat indicated generally at 10 mounted upon a solid, compressible and elastically resilient, open or closed cell polyurethane foam form 12. The hat 10 is of the style sometimes referred to as a high profile hat. The hat 10 has a hat band 30 extending about its circumference at its lower edge. A stiff hat bill 32 projects forwardly from the front of the hat 10 at about the level of the hat band 30. The crown of the hat 10 has a foreword region 34 that projects sharply upwardly from the hat band 30 and the bill 32, nearly vertically therefrom. There is a sharp break near the top of the forward region 34 of the hat crown, the upper portion of which extends rearwardly and at its highest point is surmounted by a top button 36. A rear region 38 of the hat crown of the hat 10 is more rounded than the front region 34.

The hat drying and blocking form 12 of the invention is preferably comprised of a resilient, polyurethane foam having a finished product density of between about 1.0 and about 4.5 pounds per cubic foot. Preferably, the foam density is about 2.5 pounds per cubic foot. The hat drying and blocking form is produced from a two-component system including a first polymeric isocyanate component and a second polyethylene polyol component, both of which are chosen for low density molding. Suitable components for use in producing the hat drying and blocking form 12 are sold under the trade name Maxflex-390 by Universal Polymer Corp., having a location at 14989 South Sierra Bonnita Lane, Chino, Calif. 91710.

The two components are referred to as A-component and B-component. The polymeric isocyanate A-component is comprised of about seventy percent diphenyl methane diisocyanate, and about thirty percent of higher polymers of similar structure. The polyether polyol B-component contains about 0.5 percent of a tertiary amine. The A:B component weight ratio may be between about 33:67 and about 25:75 and is preferably about 28:72. The finished product density may be varied by the addition of water or adjustment of temperature when mixing of the components occurs.

Figure 2:
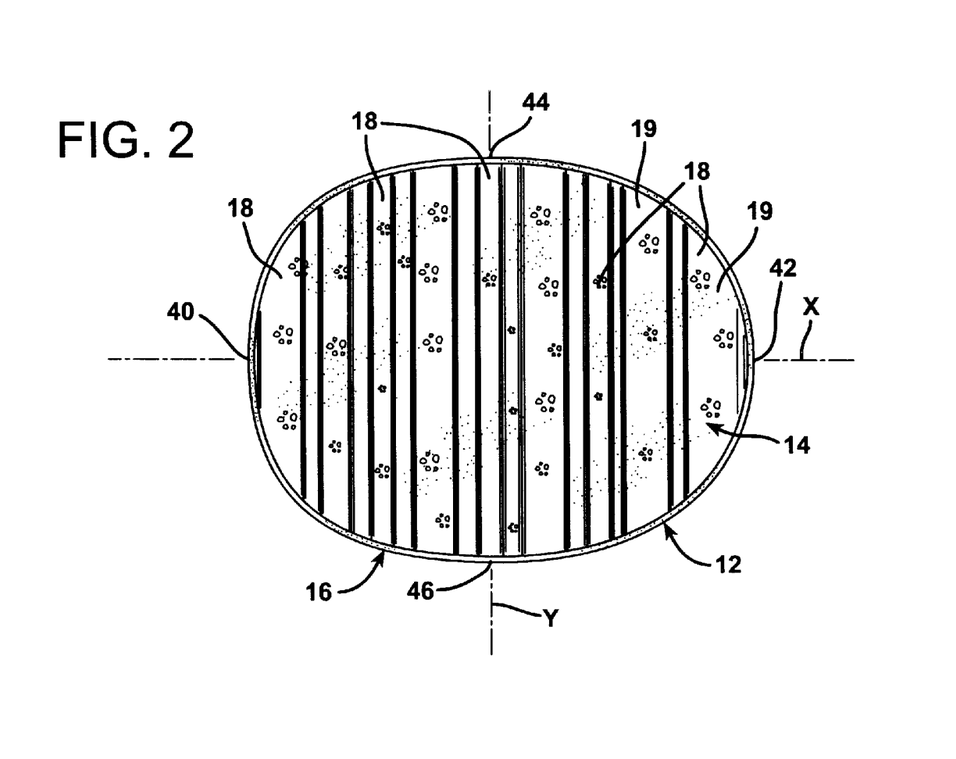
FIG. 2 is a bottom plan view of the hat form of FIG. 1 shown in isolation. from the hat.
Figure 3:
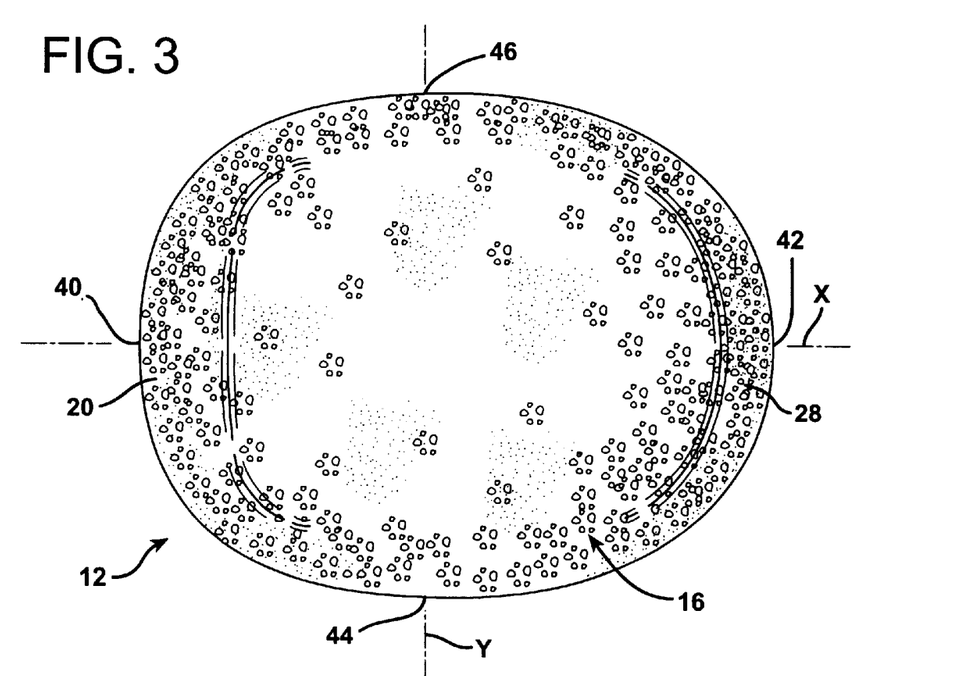
FIG. 3 is a top plan view of the hat form shown in FIG. 2.
Figure 4:
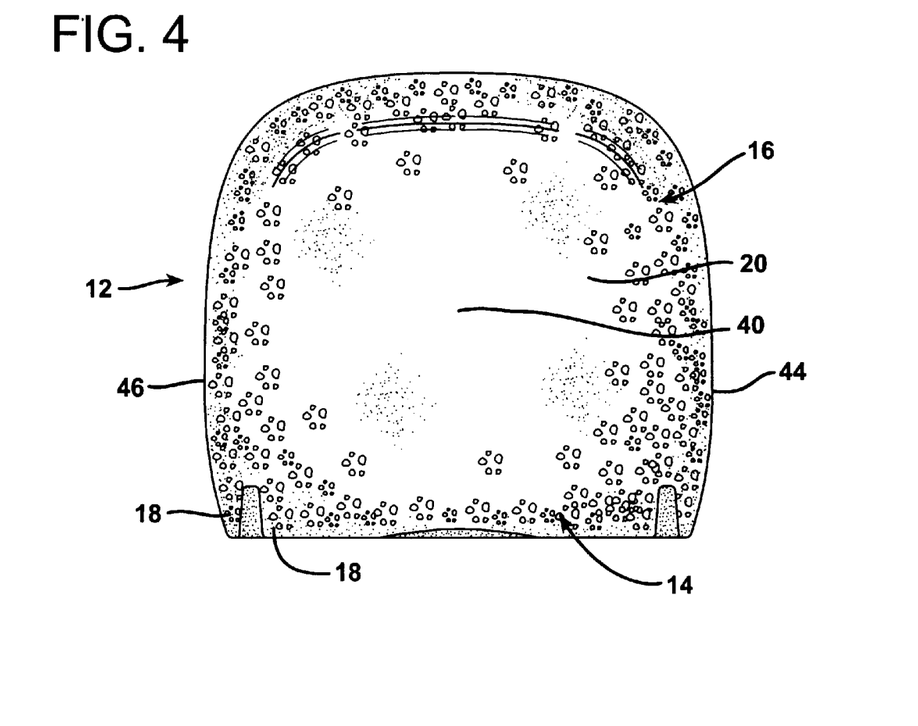
FIG. 4 is a front elevational view of the hat form shown in FIG. 2.
Figure 5:
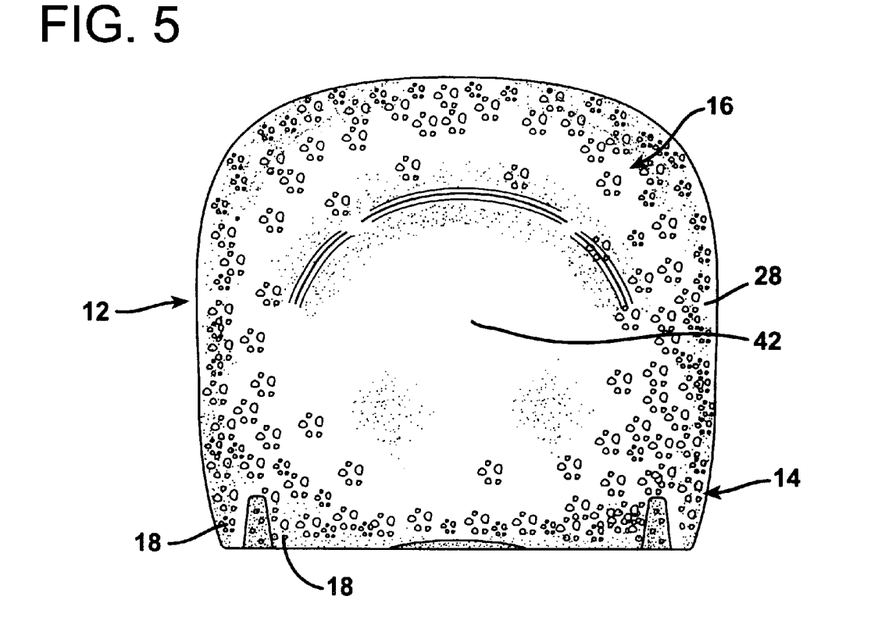
FIG. 5 is a rear elevational view of the hat form shown in FIG. 2.
Figure 6:
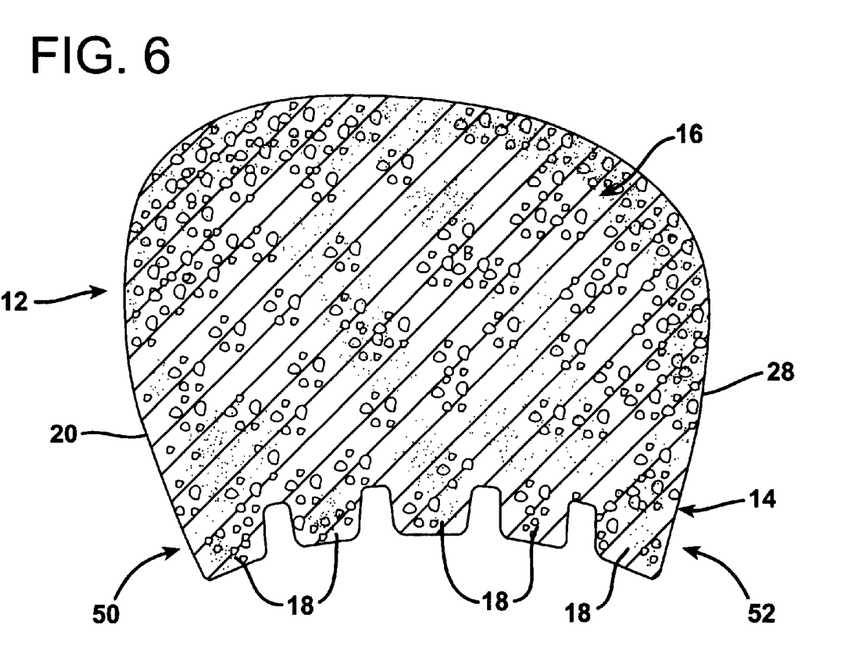
FIG. 6 is a side elevational view illustrating the manner in which the hat form of the invention is temporarily and resiliently distorted so as to allow it to be placed within a hat.
Figure 7:
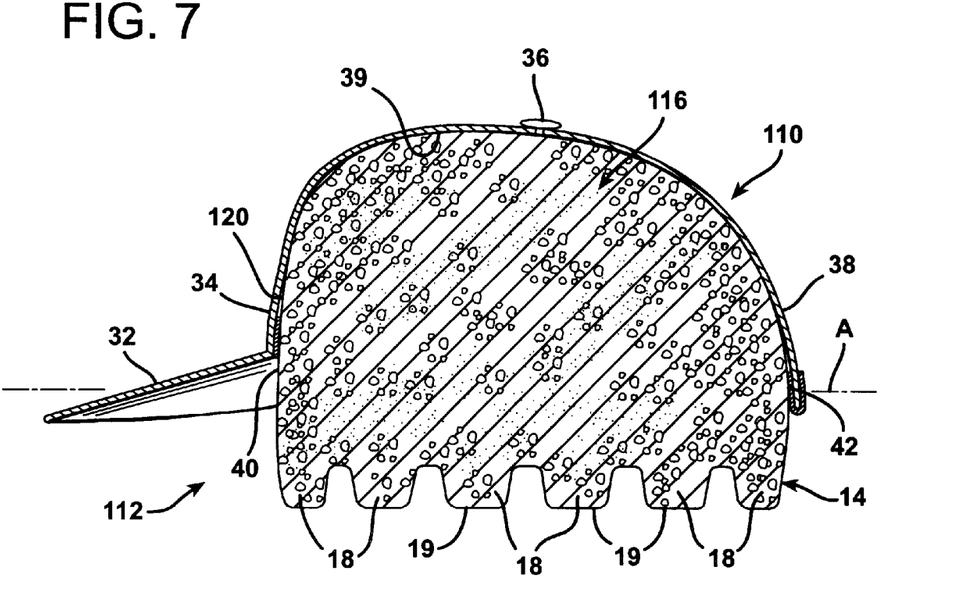
FIG. 7 is a side sectional view of a standard or more rounded profile hat blocking form utilized according to the invention shown with a hat mounted thereon.
Figure 8:
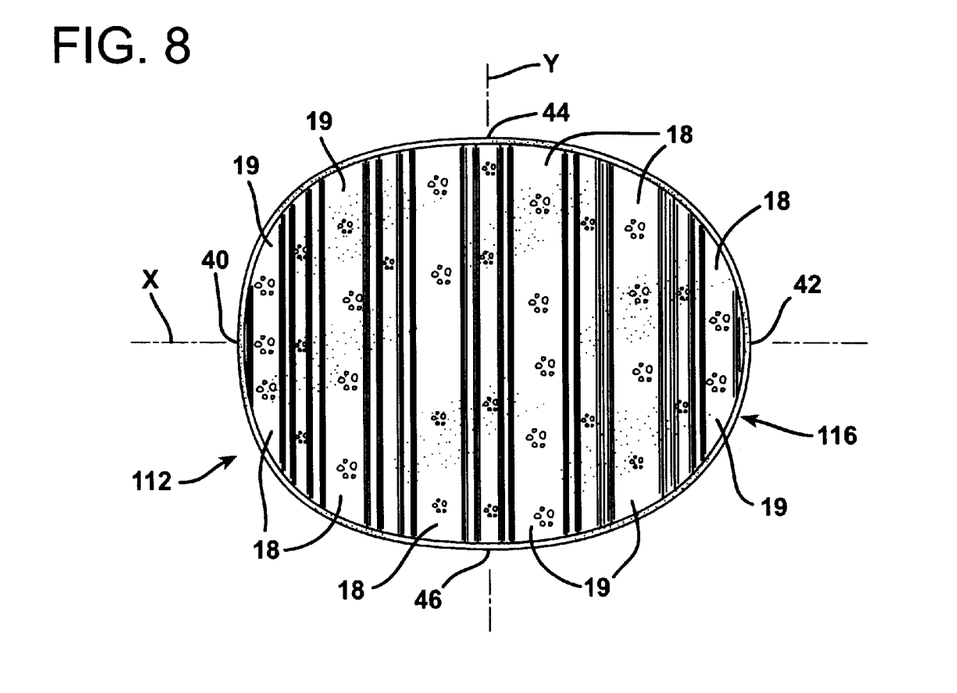
FIG. 8 is a bottom plan view of the hat form of FIG. 7 shown in isolation from the hat.
Figure 9:
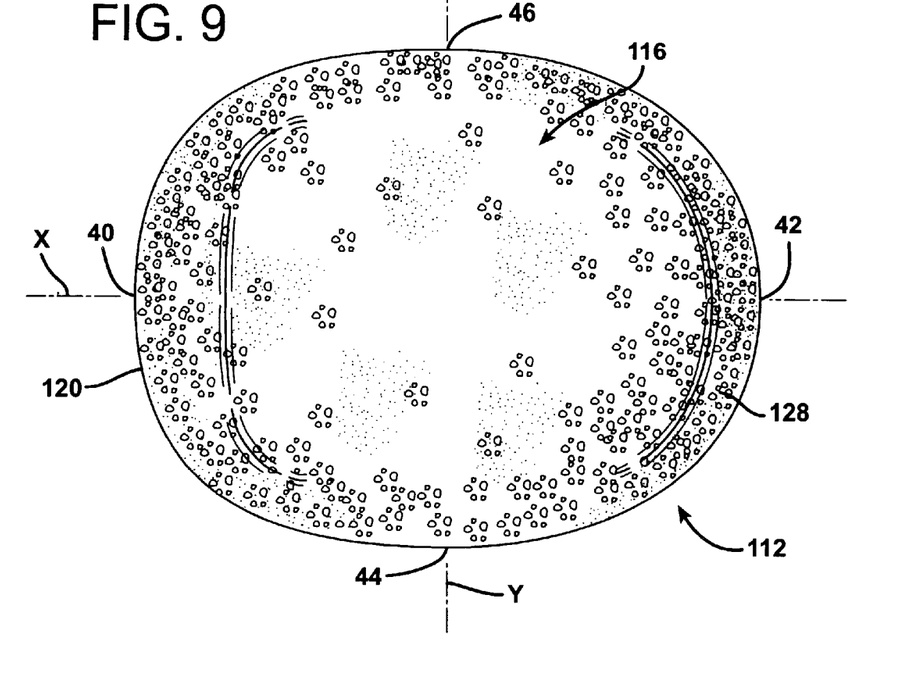
FIG. 9 is a top plan view of the hat form shown in FIG. 8.
Figure 10:
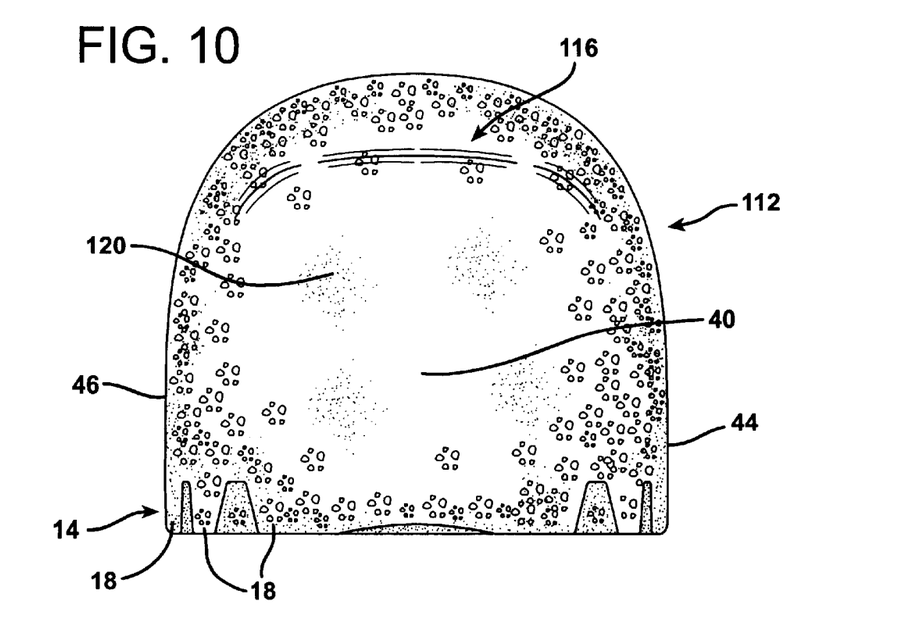
FIG. 10 is a front elevational view of the hat form shown in FIG. 8.
Figure 11:
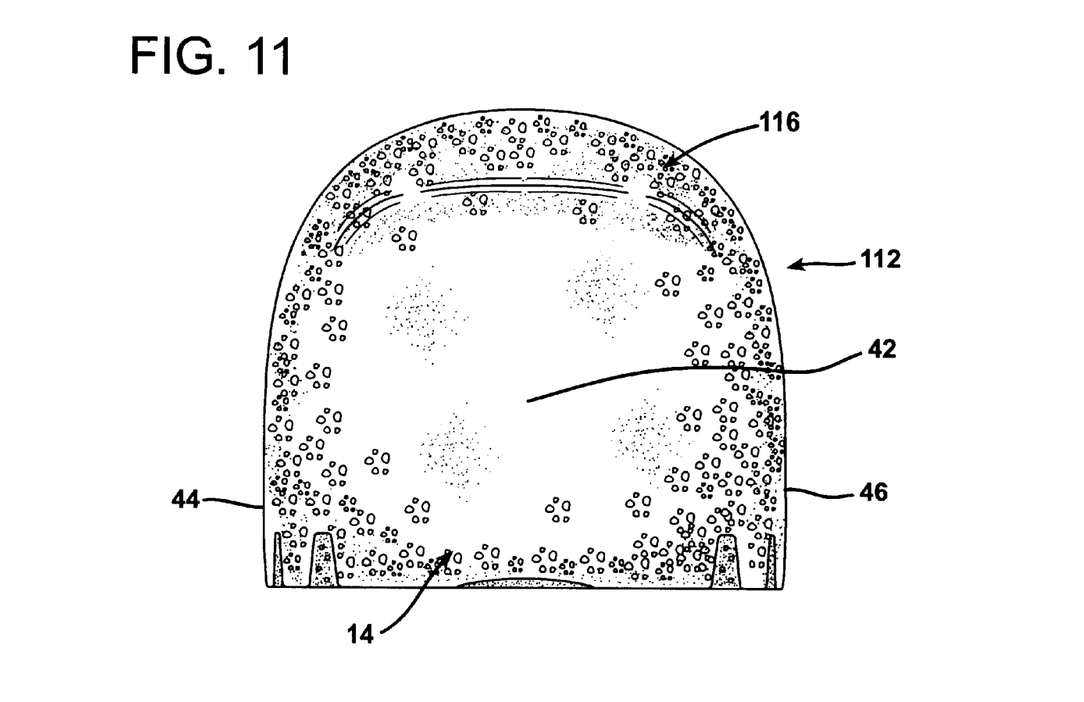
FIG. 11 is a rear elevational view of the hat form shown in FIG. 8.

The hat drying and blocking form 12 is configured generally in the shape of a human head. As illustrated in FIG. 1 the form 12 has a base 14 and a crown 16. The base 14 may be considered to delineate a longitudinal axis of alignment X and a transverse axis of alignment Y, as indicated in FIGS. 2 and 3. The base 14 is formed of a plurality of transversely extending, trapezoidal shaped ridges or ribs 18 that extend across the entire width of the bottom of the hat form 12, as illustrated in FIG. 2. Each of the base ribs 18 has a minor horizontal dimension at its bottom surface of contact 19 of about three-eighths of an inch in width and a major horizontal dimension of about one inch at the top of the channel-shaped cavities located between the ribs 18. The ribs 18 each have a vertical height of about one-half of an inch The maximum circumference of the embodiment of the hat form 12 is about 23¾ inches, which lies in the horizontal plane indicated at A about two inches above the lower surfaces of contact 19 at the lower extremities of the ribs 18. A high profile drying and blocking form 12 of this size will accommodate high profile hats 10 of hat sizes of between 6⅝ and 7¼. In this embodiment the base 14 has five transversely extending ribs 18 spaced approximately equal distances apart in a fore and aft direction from the front to the rear of the form 12.

To accommodate high profile hats of larger hat sizes of from 7⅜ to 8, a drying and blocking form having an expanded circumference would be substituted for the form 12. A larger, high profile hat form to accommodate hats of these larger sizes has a circumference in the plane A of about 26¾. In such an embodiment there are a total of six transverse base ribs 18 located on the bottom of the form.

The form 12 illustrated in drawing FIGS. 1–6 has a generally oval-shaped planar projection as seen in the bottom and top plan views of FIGS. 2 and 3. It has a generally rounded, oblong vertical planar projection, but with flattened ends, as seen in the vertical elevational front end view of FIG. 4 and the vertical elevational rear end view of FIG. 5. As can be seen in FIG. 1, the crown 16 of the high profile hat drying and blocking form 12 has a foreword, longitudinal front end 20 for receiving the forehead region 22 of the hat 10 and an aft, longitudinal rear end 28 for receiving the rear region of the hat 10 where the hat band 30 encircles the hat drying and blocking form 12 at about the vertical level of the plane A.

The height of the form 12 as measured between the plane of the lower surfaces 19 of the ribs 18 of the base 14 and the upper extremity at the center of the crown 16 beneath the hat button 36 is preferably about five and a half inches. The maximum longitudinal length of the form 12, as measured in the horizontal plane A between the longitudinal extremities 40 and 42 at the front and at the rear ends 20 and 28 of the form 12 and along the longitudinal axis X, is preferably about eight inches. The maximum transverse width of the form 12, as measured at its widest points 44 and 46 at its longitudinal center along the transverse axis Y and along the middle rib 18, is preferably about six and a half inches. A form of this size will accommodate hats of all sizes between about 6⅝ and 7¼. Thus, the form is able to accommodate the vast majority of hats that are worn by adults, as well as children.

A soiled hat 10 is first hand laundered using a small quantity of laundry detergent. Hats constructed of cotton, wool, or synthetic fabrics may be washed in this way. Once the washing is complete, the hat 10, is mounted upon the form 12. To mount a hat 10 upon the form 12 a user grips the form 12 near its base 14 and exerts compressive forces as indicated by the directional arrows 50 and 52 in FIG. 6 to elastically compress the form 12 to a slight degree. The form 12 can then be stuffed into the crown of the hat 10 with the hat band 30 and the bill 32 of the hat 10 residing at about the plane A at which the foreword extremity 40 of the drying and blocking form 12 is located and with the center of the back of the hat band 30 residing at about the plane A, that is, at about or slightly below the level of the rear longitudinal extremity 48 of the form 12. The compressive forces 50 and 52 are then released to allow the form 12 to expand slightly to the extent permitted by the shape of the hat 10. Even after the forces 50 and 52 have been removed, however, the structure of the elastomeric, resilient foam form 12 remains in a partially compressed state or condition. The continuous, expansive arcuately curved outer surface of the crown 16 of the drying and blocking form 12 resides in contact with all or nearly all of the inside surface 39 of the crown of the hat 10. The partially compressed, resilient form 12 thereby exerts outwardly directed forces throughout the surface areas of mutual contact between the form 12 and the hat 10.

The laundered but damp hat 110 is then left to dry in ambient air mounted upon the drying and blocking form 12, as illustrated in FIG. 1. The outwardly directed forces acting upon the crown of the hat 10 prevent the hat 10 from shrinking or becoming distorted during the drying process.

FIGS. 7–11 illustrate a hat drying form 112 designed for use in drying and blocking a conventional standard or rounded profile hat 110. The drying and blocking form 112 is made of the same resilient, elastomeric polyurethane foam material as the drying and blocking form 12, but has a slightly different shape. Features, common to both the hats 10 and 110 are labeled with the same reference numbers. Likewise, features, common to both the drying and blocking forms 12 and 112 are also labeled with the same reference numbers.

The front end 120 of the hat drying and blocking form 112 differs from the high profile front end 20 of the hat drying and blocking form 12 in that the front end 120 has a less vertical, and more rounded contour extending upwardly and rearwardly from the base 14. The crown 116 of the hat drying and blocking form 112 thereby has a slightly different shape and surface configuration, as is evident from a comparison of the corresponding drawing figures. However, the hat drying and blocking form 112 is used to mount and dry the standard profile hat 110 in the same way that the drying and blocking form 12 is used to mount the high profile hat 10 for drying.

The hat drying and blocking form 112 illustrated in drawing FIGS. 7 through 11 is of a size suitable for drying larger standard profile hats of the hat sizes 7⅝ through 8. The maximum circumference of the hat drying and blocking form 112 considered in the horizontal plane A is therefore preferably about 26¾ inches. It should be noted that the hat drying and blocking form 112 has a total of six transverse ribs 18 in its base 14, as contrasted with the five transverse ribs 18 employed in the smaller versions of the hat drying and blocking forms. As in the case of the high profile hat drying form 12, a smaller counterpart of the standard profile hat drying form 112 is employed to accommodate hats having a hat size of 6⅝ through 7¼. Such a form has only five of the transverse ribs 18 in its base, like the standard size, high profile hat drying and blocking form 12 depicted in drawing FIGS. 1–6.

Figure 12:
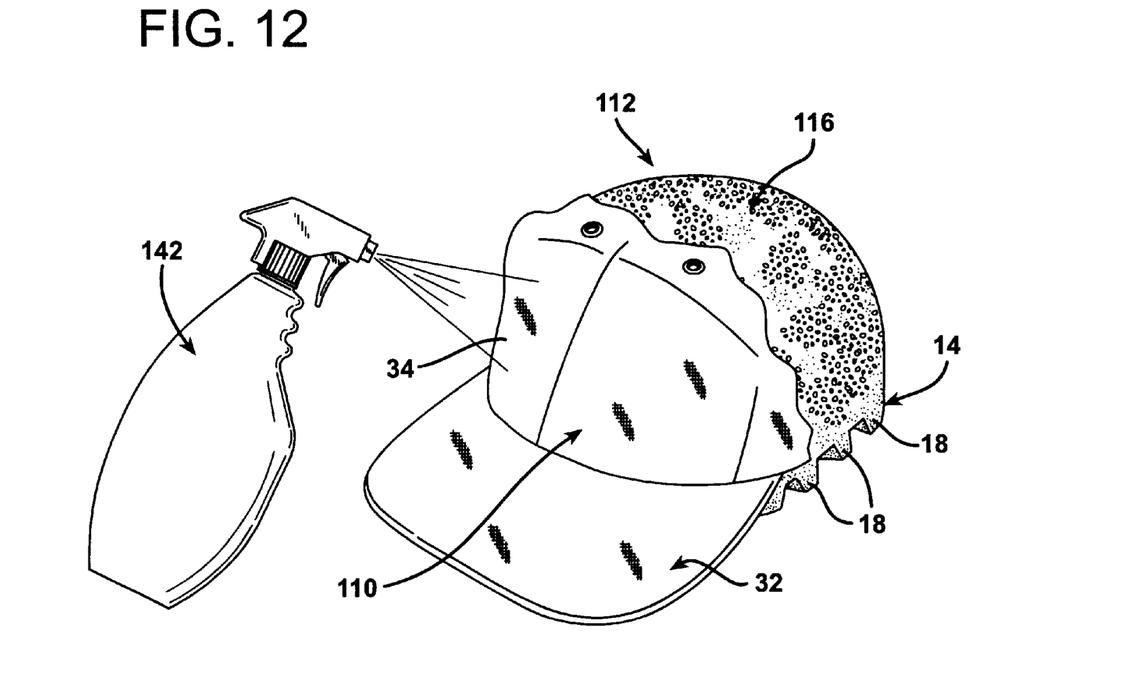
FIG. 12 is a perspective view illustrating a hat mounted upon the form shown in drawing FIGS. 7–11 being sprayed with a suitable hat spray.

To further aid in preserving the shape of a hat, both the high profile hats 10 and the standard or low-profile hats 110 may be treated with a conventional hat blocking fluid spray after they have been dried on the appropriate hat blocking and drying form of the invention. For example, the hat 110 may be temporarily removed from the form 112 and sprayed with a fine mist 40 of the liquid hat spray having the composition previously described from a conventional trigger-operated spray bottle 142, as illustrated in FIG. 12. The hat 110, while damp from the spray, is thereafter promptly placed back upon the form 112 in ambient air to dry. Once the hat 110 is dry, it is completely blocked. It is then removed from the form 112 and is ready for reuse.

By cleaning hats laundered in a conventional laundry detergent according to the method of the present invention and utilizing the hat drying and blocking forms of the invention, shrinkage of a hat is avoided even if the hat is constructed of a fabric prone to shrinkage, such as wool. Moreover, the hat maintains its original blocking and does not suffer the misshaping and distortions so characteristic of conventional hat cleaning techniques.

Undoubtedly, numerous variations and modifications of the invention will become readily apparent to those familiar with shaping and blocking of hats. For example, the hat blocking form of the invention may be constructed of rubber or any other resilient elastomeric material having an expansive, continuous outer convex curved surface rather than polyurethane. Also, while in the preferred embodiments of the invention the hat drying and blocking forms are constructed as solid structures, the density of the foam can be increased and the centers of the form can be formed with hollow cavities in order to reduce the cost of materials in fabrication. Accordingly, the scope of the invention should not be construed as limited to the specific implementation of the method and the specific embodiments of the hat drying and blocking forms depicted and described, but rather is defined in the claims appended hereto.

We claim:

1. A hat drying and blocking form comprised of a compressible and elastically resilient structure having a finished product density at least about 1.0 pounds per cubic foot and having a base delineating longitudinal and transverse axes of alignment and a crown having a continuous outer surface rising from said base and arcuately curved in both longitudinal and transverse directions for receiving a hat thereon while in a partially compressed condition, wherein said crown of said resilient structure has a forward, longitudinal end for receiving the forehead region of a hat and an aft, longitudinal end for receiving the rear region of a hat, and said forward, longitudinal end of said crown rises abruptly from said base and is curved sharply rearwardly at its upper extremity and said aft end of said crown is more rounded than said forward end of said crown, and said base is formed of a plurality of transverse ridges that extend parallel to said transverse axis across the entire width of said base and said ridges are spaced longitudinally beneath said crown from said forward end to said aft end thereof, and channel-shaped cavities are formed between said ribs, and each of said ribs has a bottom-supporting surface of contact that has a minor horizontal dimension of thickness in a direction parallel to said longitudinal axis and said ribs increase in thickness with increasing distance above said bottom surface to a major horizontal dimension at a vertical height above said bottom surface.

2. A hat drying and blocking the form according to claim 1 further comprised of a flexible, polyurethane foam having a finished product density of between about 1.0 pounds per cubic foot and about 4.5 pounds per cubic foot.

3. A hat drying and blocking form according to claim 2 wherein said polyurethane foam is further formed of a two-component system including a first polymeric isocyanate component and a second polyethylene polyol component and said first and second components are mixed in a weight ratio of between about 33:67 to about 25:75.

4. A hat drying and blocking form according to claim 1 formed as a flexible polyurethane foam having a finished product density of about 2.5 pounds per square inch and formed of a two-component system including a first polymeric isocyanate component and a second polyethylene polyol component, and said first and second components are mixed in a weight ratio of about 28:72.

5. A hat drying and blocking form according to claim 1 wherein said forward end of said crown of said resilient structure rises nearly vertically from said base.

6. A hat drying and blocking form according to claim 1 wherein said crown has a maximum circumference of between about 22 and about 27 inches considered in a plane parallel to said base.

7. A hat drying and blocking form according to claim 1 wherein said crown extends to a maximum height of between about five and about seven inches from said base.

8. In combination,
a hat having a hat band for encircling and contacting the head of a wearer and a hat crown having forehead and rear regions extending upwardly from said hat band to rest atop the crown of the head of a wearer,
a hat drying and blocking form having a longitudinally forward end and an opposite longitudinally aft end comprising a compressible and elastically resilient structure having a finished product density of at least about 1.0 pounds per cubit foot and having a base and an arcuately curved crown projecting upwardly from said base and having a continuous arcuate convex surface rising abruptly from said base at said longitudinally forward end thereof and curved rearwardly from said longitudinally forward end so that said aft end is more rounded than said forward end, and said base is formed with a plurality of transversely extending ribs that extend across the entire width of said hat drying and blocking form, each rib having a bottom surface of contact of minimum width and broadening in width with increasing distance above said bottom surface of contact, and said ribs are arranged in longitudinal separation from each other across said base from said longitudinally forward end to said opposite longitudinally aft end, and
said hat drying and blocking form is inserted into said hat and resides within said hat in a partially compressed condition with said hatband encircling said form and with said crown of said hat located in contact with said convex surface of said crown of said form, whereby said partially compressed form exerts outwardly directed forces against said hat.

9. A combination according to claim 8 herein said crown of said hat has an inner surface area that resides in contact throughout with said crown of said hat drying and blocking form.

10. A combination according to claim 8 wherein said hat drying and hat blocking form is comprised of resilient polyurethane foam having a density of between about 1.0 and about 4.5 pounds per cubic foot.

11. A combination according to claim 10 wherein said polyurethane foam is further formed of a two-complement system including a first polymeric isocyanate component and a second polyethylene polyol component and said first and second components are mixed at a weight ratio of between about 33:67 to about 25:75.

12. A combination according to claim 11 wherein said hat drying and blocking form is formed from a flexible polyurethane foam having a finished product density of about 2.5 pounds per square inch and formed from a two-component system including a first polymeric isocyanate component and a second polyethylene polyol component, and said first and second components are mixed at a weight ratio of about 28:72.

13. A combination according to claim 8 wherein said forward, longitudinal end of said form receives said forehead region of said hat and said aft, longitudinal end receives said rear region of a hat.

14. A combination according to claim 13 wherein said forward end of said crown of said form rises nearly vertically from said base.

15. A method of blocking and drying a hat which has a hat band for encircling and contacting the head of a wearer and a hat crown for extending over the crown of the head of a wearer comprising:

washing said hat with a laundry detergent, inserted into said hat while it is still damp a compressible and elastically resilient hat drying and blocking form having a finished product density of at least about 1.0 pounds per cubic foot and having a form base and an arcuately curved continuous form crown projecting upwardly from said form base and wherein said base is formed of a plurality of transverse ridges arranged across the entire width of said base and said ridges extend across the entire width of said form, each ridge having a bottom surface of contact and broadening in width in a longitudinal direction with distance from said bottom surface of contact, and said crown of said hat form is inserted into said hat by partially compressing said form so that said hatband encircles said base of said form and said crown of said hat resides in contact with said crown of said hat form while partially compressing said hat form, releasing said hat form within said hat so that it remains in a partially compressed state and thereby exerts outwardly directed forces on said hat while said hat remains mounted on said hat form, allowing said hat to dry, and removing said hat from said form once said hat has dried fully.

16. A method according to claim 15 further comprising allowing said hat to dry in ambient air.

17. A method according to claim 16 further comprising spraying said hat with a liquid hat blocking composition after allowing it to dry.

18. A method according to claim 17 wherein said hat blocking composition includes alcohol, a butyl ester of PVM/MA copolymer and amino methyl propanol.

* * * * *